(12) United States Patent
Wakuda et al.

(10) Patent No.: US 6,606,217 B1
(45) Date of Patent: Aug. 12, 2003

(54) HEAD CONTROL UNIT IN A DISK APPARATUS

(75) Inventors: Hiroshi Wakuda, Fukushima-ken (JP); Akira Mitani, Kanagawa-ken (JP)

(73) Assignees: Alps Electric Co., Ltd., Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/416,254

(22) Filed: Oct. 12, 1999

(30) Foreign Application Priority Data

Oct. 14, 1998 (JP) .......................................... 10-291821

(51) Int. Cl.[7] .............................................. G11B 5/596
(52) U.S. Cl. .................................. 360/78.04; 369/44.28
(58) Field of Search .......................... 360/78.04, 78.05, 360/77.03, 75; 369/44.28, 44.29, 44.32

(56) References Cited

U.S. PATENT DOCUMENTS

| | | | |
|---|---|---|---|
| 4,697,256 A | | 9/1987 | Shinkai |
| 5,087,997 A | | 2/1992 | Osada et al. |
| 5,170,299 A | * | 12/1992 | Moon ....................... 360/77.08 |
| 5,291,464 A | | 3/1994 | Osada et al. |
| 5,299,083 A | | 3/1994 | Kawada |
| 5,305,159 A | * | 4/1994 | Sakai et al. .............. 360/77.02 |
| 5,610,885 A | * | 3/1997 | Takahashi ................ 369/44.28 |
| 5,694,265 A | * | 12/1997 | Kosugi et al. ........... 360/77.05 |
| 6,034,838 A | * | 3/2000 | Touji et al. .......... 360/77.03 X |
| 6,356,519 B1 | * | 3/2002 | Wakuda et al. .......... 369/44.28 |

* cited by examiner

*Primary Examiner*—David Hudspeth
*Assistant Examiner*—K. Wong
(74) *Attorney, Agent, or Firm*—Brinks Hofer Gilson & Lione

(57) ABSTRACT

A zone where a head is positioned is determined in a track to be one of zones 1 to 4 according to a combination of the polarities of phase-A and phase-B detection outputs having different phases, and the positional deviation of the head from the current position to the center of the target track is obtained from the phase-B detection output in the zone. The phase-B detection output is provided with a dead zone corresponding to a range where both detection outputs have a phase-difference error. Therefore, even if the phase difference has an error, the positional deviation of the head is accurately calculated.

5 Claims, 15 Drawing Sheets

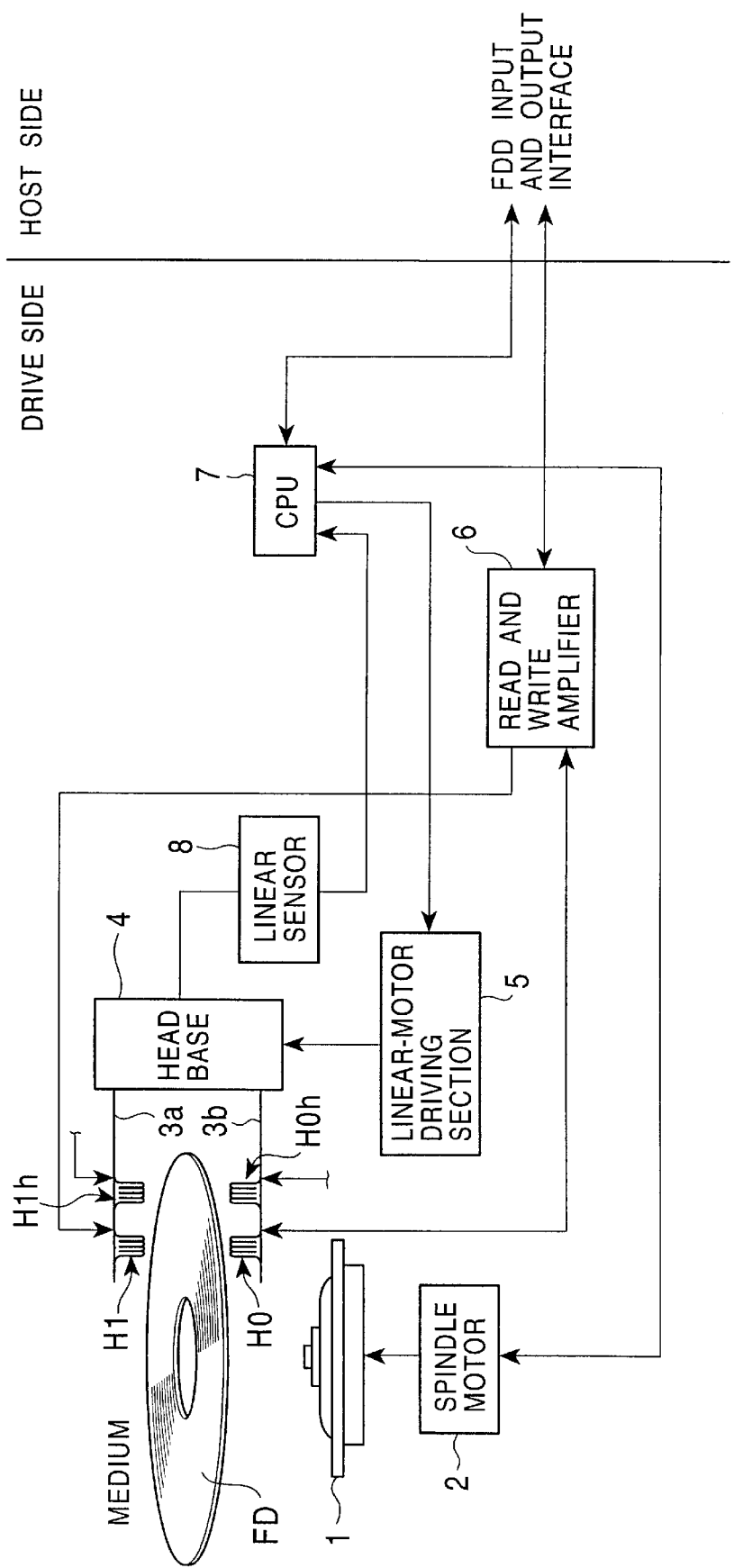

HEAD CONTROL UNIT IN A DISK APPARATUS

BACKGROUND OF THE INVENTION

1. Field of the Invention

The present invention relates to head control units for controlling a head such that the head seeks information at the center of the target track on a disk, such as a floppy disk (FD), during a reproduction operation.

2. Description of the Related Art

In a conventional floppy-disk drive apparatus, a step driving mechanism employing a stepper motor is used as a head feed unit for moving a head to a track where recording is to be performed concentrically on a recording plane of a disk. With a mechanical step operation of this head feed unit, the head is positioned at the track. Instead of the step driving mechanism, a head feed unit having a linear-motor drive is provided for some floppy-disk drive apparatuses to move the head continuously.

In a disk apparatus of such a type, a detection section detects a return of the head to the origin and reports it to the host computer. To move the head to the target track of a disk, the host computer sends seek instruction pulses formed of STEP pulses one for one track and a seek request direction to the disk apparatus. According to this seek instruction pulses, the disk apparatus moves the head by the number of tracks corresponding to the seek instruction pulses.

In apparatuses such as the conventional floppy-disk drive apparatus, a screw shaft driven by a stepper motor is engaged with a head base and the head is fed by the rotation of the screw shaft. Since the mechanical connection determines the relationship between the rotation of the stepper motor and the movement position of the head, the head is moved to the target track just by driving the stepper motor according to the seek instruction pulses sent from the host computer.

On the other hand, in apparatuses employing a head feed unit having a linear-motor drive, since a head base has flexibility in the head feed unit, a detection section for always detecting the movement position of the head needs to be provided.

Such a head feed unit having a linear-motor drive is, for example, included in a disk apparatus in which a high-density-recording disk on which a servo signal is recorded for tracking and a floppy disk (FD) having a capacity of 2 megabytes (MB) can be loaded. The high-density disk to be loaded into this type of a disk apparatus is also a flexible disk. In the following description, a flexible disk having a capacity of 2 MB is called a floppy disk and it is discriminated from the high-density disk.

When the high-density disk is loaded, the head is moved by a linear-motor drive. When the head reads the servo signal, it is determined that the head has been positioned at a track. On the other hand, when a floppy disk is loaded, the head feed position is controlled according to the detection output of the detection section and the head is positioned at the track.

FIG. 14A shows an example detection output of the detection section provided for the disk apparatus. This type of detection section is formed, for example, of a scale having fixed-interval slits provided for one of the moving side and the fixed side and a pair of optical detection devices provided for the other side. As the head base moves, phase-A and phase-B detection outputs having a relative phase difference of one-fourth the period (90 degrees) are obtained from the pair of the optical detection devices.

In FIG. 14A, the horizontal axis indicates the head movement position in the radial direction of the disk and the phase of the phase-B detection output, and the vertical axis indicates the strength (voltage) of the detection outputs. As shown in FIG. 14A, the phase-A detection output and the phase-B detection output have the relationship of the sine curve and the cosine curve, or curves approximating to these trigonometric functions.

As shown in FIG. 14A, detection data to be used is switched from the phase-A detection output to the phase-B detection output and vice versa at intersections of both detection outputs. As a result, the movement position of the head is detected with the use of a part of the detection outputs, which shows linearity and is indicated by a solid line in FIG. 14A. FIG. 14B shows head positions calculated according to the detection data, shown by the solid line in FIG. 14A. The horizontal axis indicates the phase of the phase-B detection output and the vertical axis indicates the detected value of the head position.

As shown in FIG. 14A, with the alternate use of the parts of the detection outputs, which show strong linearity, the relationship between the detection outputs and the head position is obtained with a high precision as a relationship approximating to a linear function, as shown in FIG. 14B. When the position of the detection section is adjusted such that the positions corresponding to phases of 0 degrees, 360 degrees, 720 degrees, . . . of the phase-B detection output match the centers of tracks, the positional deviation from the head position to a track center is always obtained positively.

When the output value of the detection section is abruptly shifted due to the movement of the head caused, for example, by an external impact, since the detection output linearly relates to the head position as shown in FIG. 14B, it is easily determined whether the head has been moved toward the center of the disk or toward the outside.

In the detection section, described above, which uses the scale having the slits and the pair of optical detection devices, the machining tolerance of the slits in the scale or an error in the relative positions of the pair of the optical detection devices cannot be eliminated. An error in the phase difference between the phase-A detection output and the phase-B detection output cannot be avoided as shown in FIG. 14A. In an actual apparatus, it is possible that the phase difference between the phase-A and phase-B detection outputs is shifted by about ±30 degrees from a reference of 90 degrees.

FIG. 15A shows a case in which the phase-A detection output is shifted from the phase-B detection output by 30 degrees measured from an original phase difference of 90 degrees.

The position of the detection section is adjusted such that the head is positioned at the centers of tracks on the disk when the phase-B detection output is 0 degrees, 360 degrees, 720 degrees . . . . Under this condition, when detection data to be used is switched from the phase-A detection output to the phase-B detection output and vice versa at the same timing as that in FIG. 14A, the detection data to be used has steps at the switching points of both phase detection outputs, as shown in FIG. 15A. FIG. 15B shows the relationship between the phase (horizontal axis) of the phase-B detection output and the detection value (calculated value) of the head position. Since a phase tolerance is formed between the phase-A and phase-B detection outputs as shown in FIG. 15B, the detected position includes incontinuous points.

While the head is gradually approaching the center of the target track and the head-movement speed is decreasing, for example, when the head reaches an incontinuous point shown in FIG. 15B, speed control servo responds sensitively in head seek control and the head is likely to become uncontrollable or a seek error is likely to happen such as a to-and-fro repeated movement of the head.

On the other hand, it is possible that a one-phase detection output is obtained from the detection section and the head position is detected according to the one-phase detection output. In this case, around the peaks of the one-phase detection output, detection-output linearity cannot be obtained. While the detection output is around its peak, if the head is moved by an external impact and the detection output exceeds its peak point, it becomes impossible to determine the direction in which the head has been moved. As a result, a track counting error occurs.

SUMMARY OF THE INVENTION

The present invention has been made to solve the above conventional drawbacks. Accordingly, it is an object of the present invention to provide a head control unit used for a disk apparatus, which is unlikely to generate a track counting error.

Another object of the present invention is to provide a head control unit used for a disk apparatus, which allows a head-position detection and a positional deviation from the center of the target track to be obtained accurately and which is unlikely to generate a seek error, even if the phase difference between two-phase detection outputs used has a tolerance.

One of the foregoing objects of the present invention is achieved through the provision of a head control unit in a disk apparatus having a rotation driving section for driving a disk, a head facing a recording surface of the disk, head feeding means for feeding the head in a direction in which the head traverses tracks on the disk, a detection section for generating a detection output changed according to the movement of the head, and a control section for controlling the head feeding means according to the detection output obtained by the detection section, wherein the detection section outputs phase-A and phase-B detection outputs having different phases and having polarities changing at an interval of half the period according to the movement of the head; and the control section controls such that it is determined from a combination of the polarity of the phase-A detection output and that of the phase-B detection output that the head has been moved to an adjacent track, the track number of the current head position is incremented or decremented by 1, an intra-track deviation from the current head position to the center of the track is detected by the use of either the phase-A detection output or the phase-B detection output, a deviation from the current head position to the center of the target track is calculated from the track number and the detected intra-track deviation, and the head feeding means moves the head according to the deviation from the current head position to the center of the target track.

The present invention is suited to a system which uses head feeding means having flexibility in moving the head as in a case in which the head is driven by a linear motor.

In the present invention, the detection outputs having two different phases are obtained by the detection section. From one of the two detection outputs, the positional deviation from the current head position to the center of the track is obtained in an analog manner, and the head position in the track is obtained from the combination of the polarity of the phase-A detection output and that of the phase-B detection output in a digital manner. Therefore, even if the head is moved due to an external impact and a detection output exceeds its usual peak, the zone where the head is positioned in the track can be determined from the polarity of the phase-A detection output and that of the phase-B detection output. As a result, if the head is moved by impact, the head position is recognized and a track counting error does not occur.

It is preferred that the head control unit be configured such that the phase-A detection output and the phase-B detection output basically have a phase difference of one-fourth the period, one track is divided into four zones each having a different combination of the polarity of the phase-A detection output and that of the phase-B detection output, a track-number difference between the number of the target track and that of the track where the head is positioned and an intra-track deviation from the current head position to the center of the track are detected in each of the four zones, and a deviation to the center of the target track is calculated from the track-number difference and the intra-track deviation.

With one track being divided into the four zones, the positional deviation from the current head position and the center of the target track can be relatively easily calculated.

It is preferred that the head control unit be configured such that it is anticipated that the phase-A and phase-B detection outputs have a relative phase-shift tolerance, and whichever of the phase-A and phase-B detection outputs used for detecting the intra-track deviation is provided with a dead zone where the relative phase-shift tolerance may be generated and detected values are fixed.

In the present invention, the head position and the positional deviation can be obtained without the dead zone. When the phase-A detection output and the phase-B detection output have a relative phase-shift tolerance, however, the positional deviation has an incontinuous part corresponding to the tolerance. In this case, this incontinuity may adversely affect a seek operation. Therefore, with the dead zone being provided, if the relative phase-shift tolerance is generated, a precise head seek operation is implemented irrespective of the phase shift.

It is preferred that the head control unit be configured such that the control section performs speed control for sending a speed control signal to the head feeding means when the head approaches the target track; a detected speed difference is obtained from a difference between the current detected movement speed of the head and a target speed specified according to the deviation from the current head position to the center of the target track, and a compensation gain is set in the speed control signal according to the detected speed difference; and the compensation gain is increased when the head passes through the dead zone provided for the target track and approaches the center of the target track.

When the dead zone is provided, the head position is detected in the dead zone as if the head were stopped. Therefore, when the head passes through the dead zone and approaches the center of the target track, control is performed such that the head speed is abruptly increased. Since the head can be decelerated with the use of the gain control when the head has passed the dead zone, the head is promptly stopped at the target track.

It is preferred that the head control unit be configured such that, in the control section, when the head is positioned at the center of the target track, on-track control for sending an on-track control signal to the head feeding means is performed, and a proportional gain for compensating for the deviation from the current head position to the center of the target track is set in the on-track control signal in the on-track control; and when the head approaches the center of the target track, the speed control is switched to the on-track control at a first switching point where the head is positioned a predetermined distance away from the dead zone in the target track, the on-track control is switched to the speed control at a second switching point where the head is moved away from the center of the target track after the control has been switched to the on-track control, and the second switching point is disposed at a position farther away from the center of the target track than the first switching point.

It is further preferred that the second switching point match an end of the dead zone, closer to the center of the target track.

When the second switching point, where the on-track control is switched to the speed control when the head is moved away from the center of the target track under the on-track control state, is disposed at a position farther away from the center of the target track than the first switching point, where the speed control is switched to the on-track control when the head approaches the center of the target track to be on the track, the head is quickly moved to a point near the center of the target track when the head is moved to the center of the target track, and on-track recovery is stably performed when the head leaves the center of the target track. Therefore, an on-track state is easily maintained even if vibration or impact is applied.

As described above, since a seek operation toward the center of the target track is performed with the use of both phase-A detection output and phase-B detection output obtained by the detection section in the present invention, a track counting error is prevented in updating.

Since the dead zone is provided for a detection output used for obtaining a positional deviation, even if the phase difference between the phase-A and phase-B detection outputs has an error, the positional deviation from the head to the center of the target track is accurately obtained and a seek error is prevented.

In addition, since the gain is set in the speed control, an uncontrollable movement of the head is prevented when the head has passed the dead zone. Because the switching points between the speed control and the on-track control are specified, the head is quickly moved to the center of the target track and the head is made stable at the on-track state.

BRIEF DESCRIPTION OF THE DRAWINGS

FIG. 1 is a block diagram of a head control unit according to the present invention.

FIG. 2A is a side view of the linear scale, and FIG. 2B is a partial plan showing the relationship between the optical detector and the linear scale.

FIG. 14A is a view of the waveforms of the phase-A detection output and the phase-B detection output, and FIG. 14B is a view showing the detected head position.

FIG. 15A is a view of the waveforms of the phase-A detection output and the phase-B detection output, and FIG. 15B is a view showing the detected head position.

DESCRIPTION OF THE PREFERRED EMBODIMENT

Figure 2A:
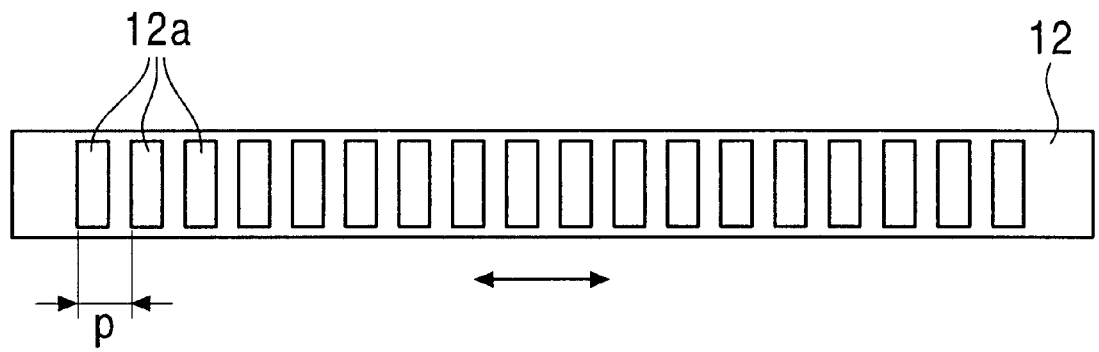
FIGS. 2A and 2B show an example structure of a detection section formed of a linear scale and an optical detector.

FIG. 1 is a block diagram of a disk apparatus according to the present invention.

The disk apparatus can load a high-density-recording disk and a floppy disk (FD) having a capacity of 2 MB and conforming to the same standard as a conventional disk.

The disk apparatus includes a turntable on which the center section of each of the above disks is loaded, that is, a rotation driving section 1. The rotation driving section 1 is rotated by a spindle motor 2. When a floppy disk (FD) is loaded on the rotation driving section 1, a magnetic head H0 at a side 0 contacts one recording surface of the disk and a magnetic head H1 at a side 1 contacts the other recording surface.

The magnetic head Hi is supported by a support arm 3a, and the magnetic head H0 is supported by a support arm 3b. Both support arms 3a and 3b are supported by a head base 4. The head base 4 can be continuously fed in the radial direction of the disk D by a head feeding unit having a linear-motor driving section 5.

The magnetic heads H0 and H1 are connected to an FDD input and output interface through a read and write amplifier 6. The host computer sends a control signal for controlling the floppy-disk drive to the input and output interface.

When data is recorded into or reproduced from the floppy disk (FD), the movement of the head base 4 is detected by a linear sensor 8 serving as a detection section, and the detection output is sent to a CPU 7 serving as a control section. The CPU 7 controls the linear-motor driving section 5 and the spindle motor 2.

The support arms 3a and 3b also have other magnetic heads H0h and H1h used for a high-density-recording magnetic disk. When a high-density-recording disk is loaded on the rotation driving section 1, recording and reproduction are performed with the use of the magnetic heads H0h and H1h.

In the high-density-recording disk, a servo signal for tracking is recorded on a recording surface. The CPU 7 detects the servo signal according to the reproduction outputs of the magnetic heads H0h and H1h, controls the linear-motor driving section 5 by the use of this servo signal, and performs a head seek operation and on-track control. Therefore, when a high-density-recording disk is loaded, the output of the linear sensor 8 is not used for seek control. An input and output interface (not shown) used for recording and reproduction operations of a high-density-recording disk is provided separately from the FDD input and output interface shown in FIG. 1.

Figure 2B:
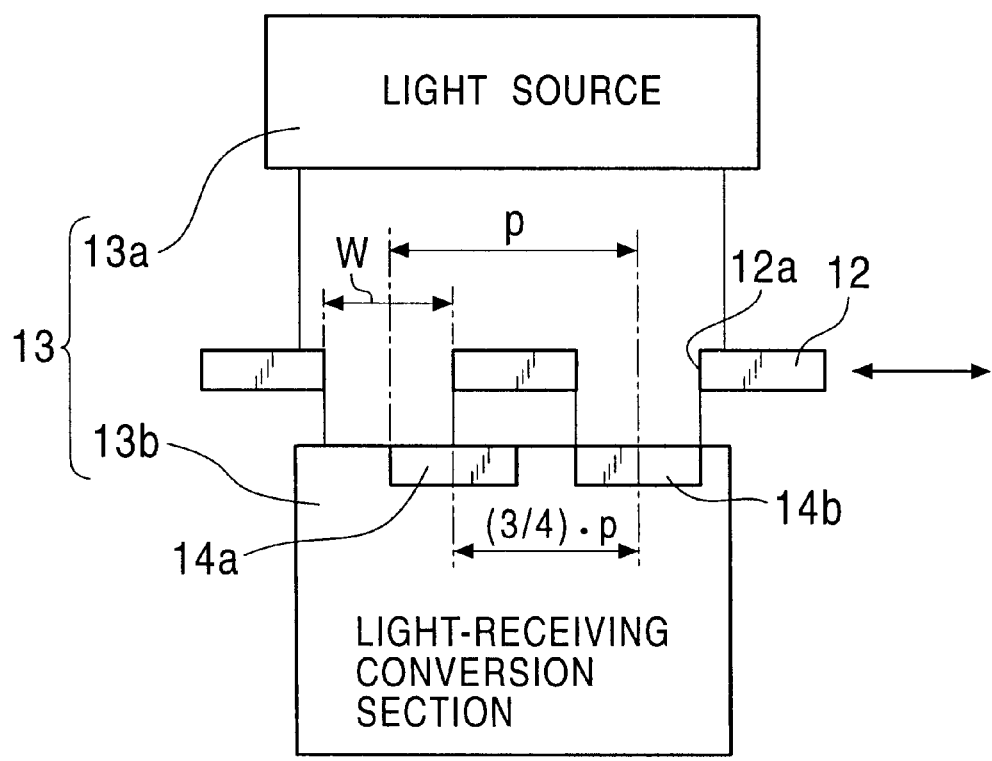

The detection section for detecting the position of heads when the floppy disk (FD) is loaded, namely, the linear sensor 8, is formed of a linear scale 12 and an optical detector 13 as shown in FIGS. 2A and 2B. Either the linear scale 12 or the optical detector 13 is connected to the head base 4, and the other is connected to a chassis.

The linear scale 12 is formed of a narrow plate for which a plurality of detection windows (slits) 12a are provided at a constant interval. The optical detector 13 is formed of a light source 13a and a light-receiving conversion section 13b fixed opposite to each other with the linear scale 12 sandwiched therebetween. The light-receiving conversion section 13b is provided with a light-receiving device 14a and a light-receiving device 14b.

The light-receiving device 14a and the light-receiving device 14b are disposed at a distance of 3p/4, where p indicates the interval of the detection windows 12a made in the linear scale 12.

Light emitted from the light source 13a passes through the detection windows 12a formed in the linear scale 12 and is detected by the light-receiving devices 14a and 14b. Since the linear scale 12 and the optical detector 13 move relatively, two-phase detection outputs having strengths which change like trigonometric functions or those approximating to trigonometric functions are obtained from the light-receiving devices 14a and 14b. Due to the interval "p" of the detection windows 12a in the linear scale 12, the light-receiving output obtained from the light-receiving device 14a and that obtained from the light-receiving device 14b have a phase difference of one-fourth the period (90 degrees).

A third detection unit for detecting the position of the head base when the magnetic heads H0 and H1 are positioned on the most outer track (track number: 0) of the disk is provided, although it is not shown in the figure.

When the floppy disk (FD) is loaded into this disk apparatus, the host computer performs through the FDD input and output interface the same control as for a conventional floppy-disk drive apparatus. Specifically, when the third detection unit moves the magnetic heads H0 and H1 to the most outer track (track number: 0), the CPU 7 recognizes the condition and reports it to the host computer. In seek control, the host computer sends seek instruction pulses, one pulse for one track, to the CPU 7 of the disk apparatus.

A seek control operation performed when the floppy disk (FD) is loaded into the disk apparatus will be described below.

(Calculating the Positional Deviation of the Heads)

Figure 3A:
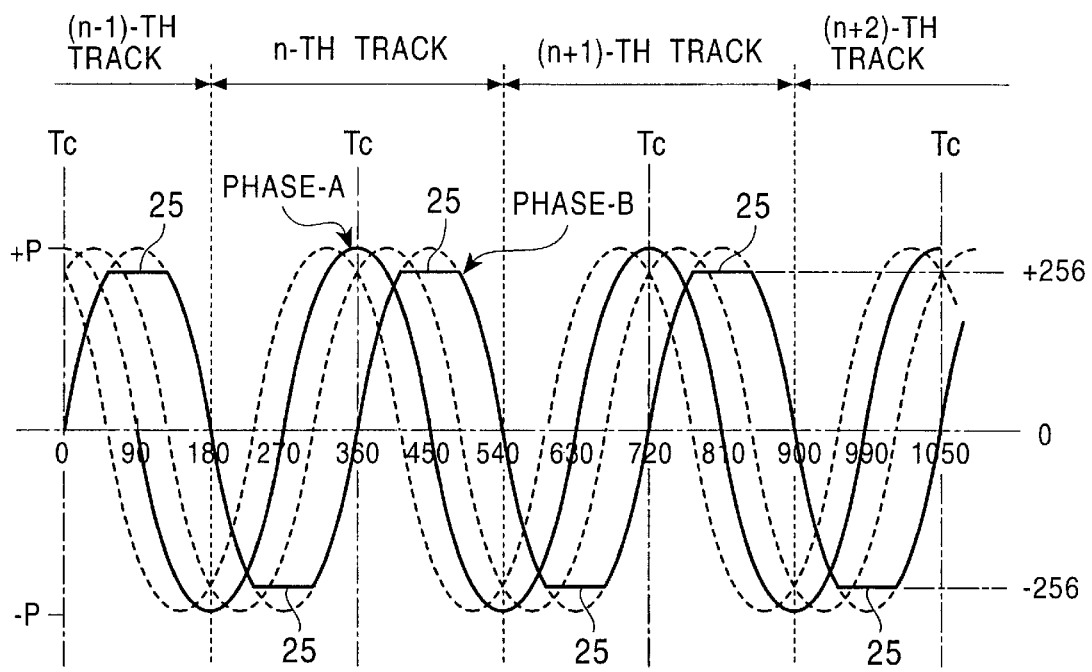
FIG. 3A is a view of the waveforms of phase-A and phase-B detection outputs.
Figure 4A:
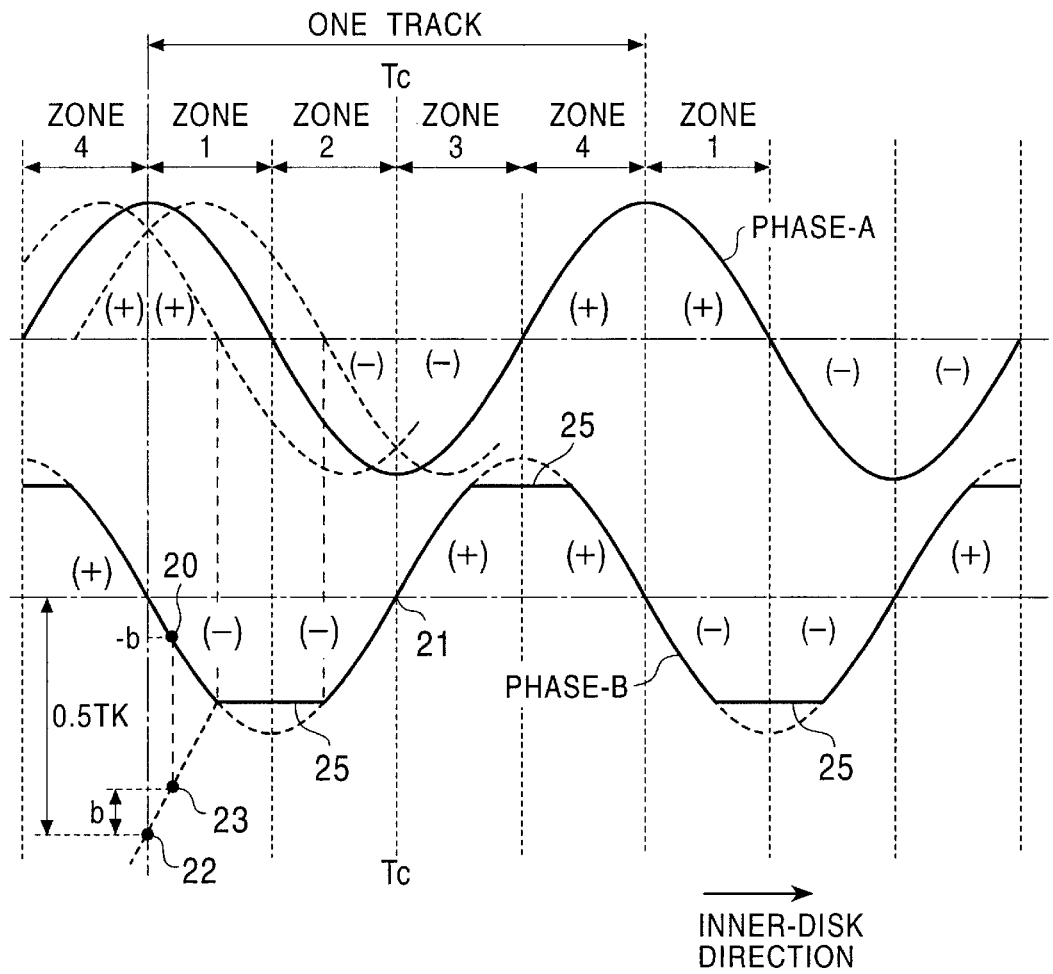
FIGS. 4A and 4B are views extended in the time domain of FIGS. 3A and 3B, respectively.

FIG. 3A shows the detection output of the linear sensor 8 obtained when the magnetic heads H0 and H1 are moved in a track transverse direction of the disk. FIG. 4A is a view of a part shown in FIG. 3A, extended in the horizontal direction.

The detection output obtained when the light-receiving device 14a of the light-receiving conversion section 13b receives light is called a phase-A detection output, and the detection output obtained when the light-receiving device 14b receives light is called a phase-B detection output. The horizontal axes of FIG. 3A and FIG. 4A mean the radial direction of the disk and correspond to the phase of the phase-B detection output. The phase-A detection output has a phase difference of one-fourth the period (90 degrees) against the phase-B detection output as a design value. The vertical axes indicate the strength (voltages converted by photoelectric conversion) of the detection outputs. The peaks of the detection output of each phase are indicated by +P and −P.

The phase-B detection output has a center value (0-V point) at phases of 0 degrees, 180 degrees, 360 degrees, 540 degrees, 720 degrees, . . . . The mount position of the linear sensor 8 is adjusted such that the magnetic heads H0 and H1 match the center Tc of each track on the disk when the phase is equal to 360 degrees multiplied by N (N being an integer). The period (360 degrees) of the phase-B detection output corresponds to one track pitch (for example, 187.5 µm). The area within 180 degrees in both directions from the track center Tc corresponds to one track. In the following description, the track center Tc of the n-th track is set to the center of the target track in a seek operation for the sake of convenience.

In FIG. 3A and FIG. 4A, a solid line indicates a phase-A detection output obtained as designed, namely, the phase-A detection output having an accurate phase difference of 90 degrees against the phase-B detection output, and dotted lines indicate the range of phase-A detection outputs having an expected tolerance against the designed value before and after the solid line. This tolerance is generated by a machining error of the linear scale 12 or an error of the relative mount positions of the light-receiving device 14a and the light-receiving device 14b. In FIG. 3A and FIG. 4A, the tolerance of the phase difference between the phase-A and phase-B detection outputs is set to ±30 degrees.

In the present invention, to detect the current head position and a positional deviation from the current head position to the center of the target track, a combination of the polarity of the phase-A detection output and that of the phase-B detection output is calculated. From the calculated value, the zone in a track, where the heads are positioned is detected. According to the phase-B detection output, the positional deviation from the current head position to the track center Tc in the track is detected.

FIG. 4A shows the polarity of the phase-A detection output and that of the phase-B detection output. Since the phase-A detection output and the phase-B detection output change as trigonometric functions or in manners similar to those, the polarity of each detection output changes in every 180 degrees (half the period).

Therefore, the combination of the polarity of the phase-A detection output and that of the phase-B detection output changes in four ways in one track. When the polarity of the phase-B detection output is negative (−) and that of the phase-A detection output is positive (+), the corresponding zone in a track is called a zone 1, when both polarities of the phase-B and phase-A detection outputs are negative (−), the corresponding zone is called a zone 2, when the polarity of the phase-B detection output is positive (+) and that of the phase-A detection output is negative (−), the corresponding zone is called a zone 3, and when both polarities of the phase-B and phase-A detection outputs are positive (+), the corresponding zone is called a zone 4.

The CPU 7 periodically samples the phase-A and phase-B detection outputs, calculates the combination of both obtained outputs, determines that the magnetic heads have been moved to an adjacent track when the CPU 7 recognizes that the magnetic heads have been moved from the zone 4 to the zone 1, and a track counter is incremented by 1. When the CPU 7 recognizes that the magnetic heads have been moved from the zone 1 to the zone 4, the track counter is decremented by 1. The track counter is included in the CPU 7.

Figure 10:
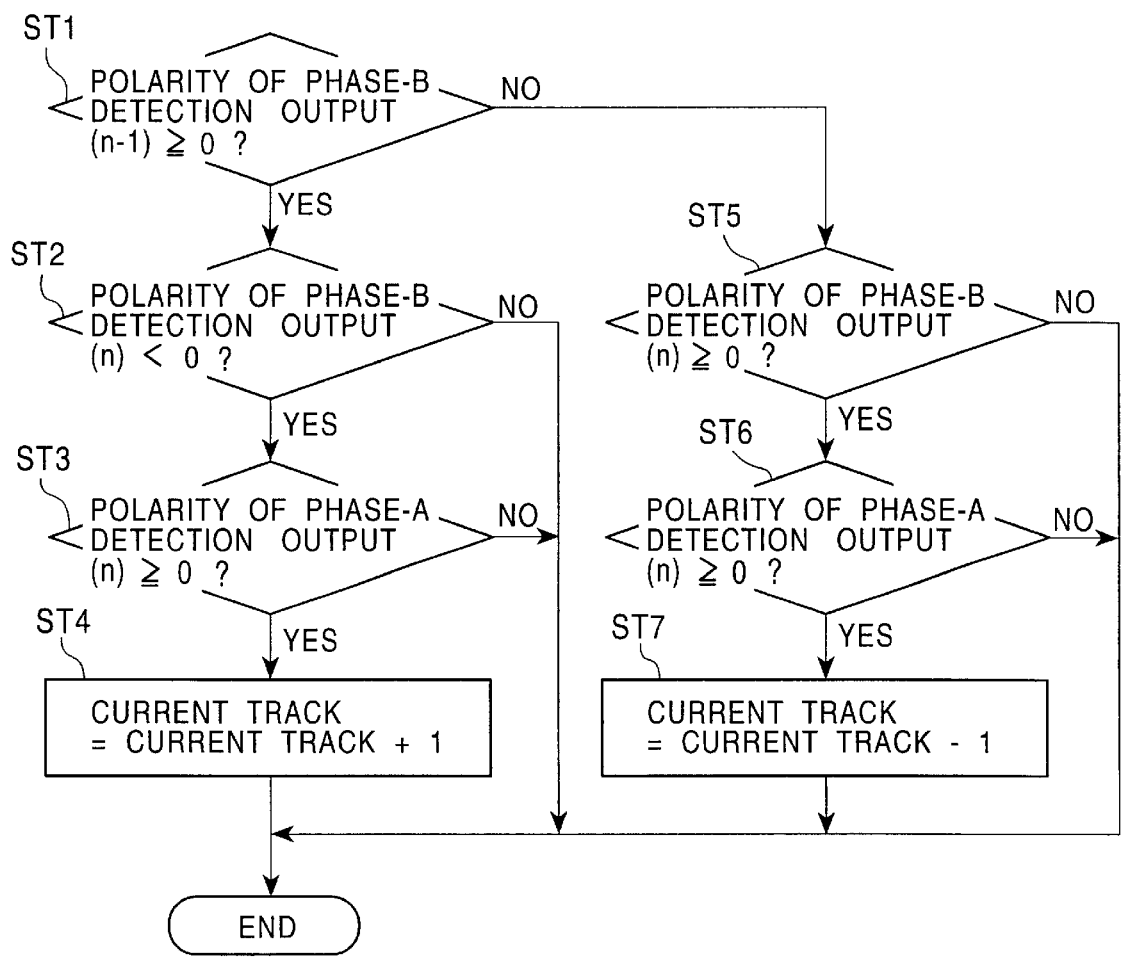
FIG. 10 is a flowchart of an operation for detecting a track update from the polarity of the phase-A detection output and that of the phase-B detection output.

According to the increment or the decrement of the track counter, the number of the track where the magnetic heads are positioned can be recognized in a seek operation and an on-track operation. FIG. 10 is a flowchart showing a control operation for updating the track number with the use of the combination of the polarities of the detection outputs. FIG. 10 shows a case in which each detection output is obtained at the n-th sampling.

In a step (hereinafter called ST) 1 in FIG. 10, it is determined whether the polarity of the phase-B detection output obtained at the previous sampling is positive (+) or negative (−). When it is determined in the ST1 that the polarity of the phase-B detection output is positive (+), the processing proceeds to a ST2 and it is determined whether the polarity of the phase-B detection output obtained in the current sampling is negative (−). When it is determined that the polarity is negative, the processing proceeds to a ST3 and it is determined whether the polarity of the phase-A detection output obtained in the current sampling is positive (+). When it is determined that the polarity of the phase-A detection output is positive (+), it is recognized that the heads have been moved from the N-th track to the (N+1)-th track and the track counter is incremented by 1 in a ST 4.

When it is determined in the ST 1 that the polarity of the phase-B detection output obtained in the previous sampling is negative (−), if the polarity of the phase-B detection output obtained in the current sampling is switched to positive (+) in a ST 5, the polarity of the phase-A detection output obtained in the current sampling is checked in a ST 6. When the polarity of the phase-A detection output is positive (+), it is recognized that the heads have been moved from the N-th track to the (N−1)-th track and the track counter is decremented by 1 in a ST 7.

The positional deviation from the current head position to the center of the target track is next obtained from the current track number indicated by the track counter and the phase-B detection output. This calculation is performed in three different ways according to the zone where the heads are positioned.

Figure 11:
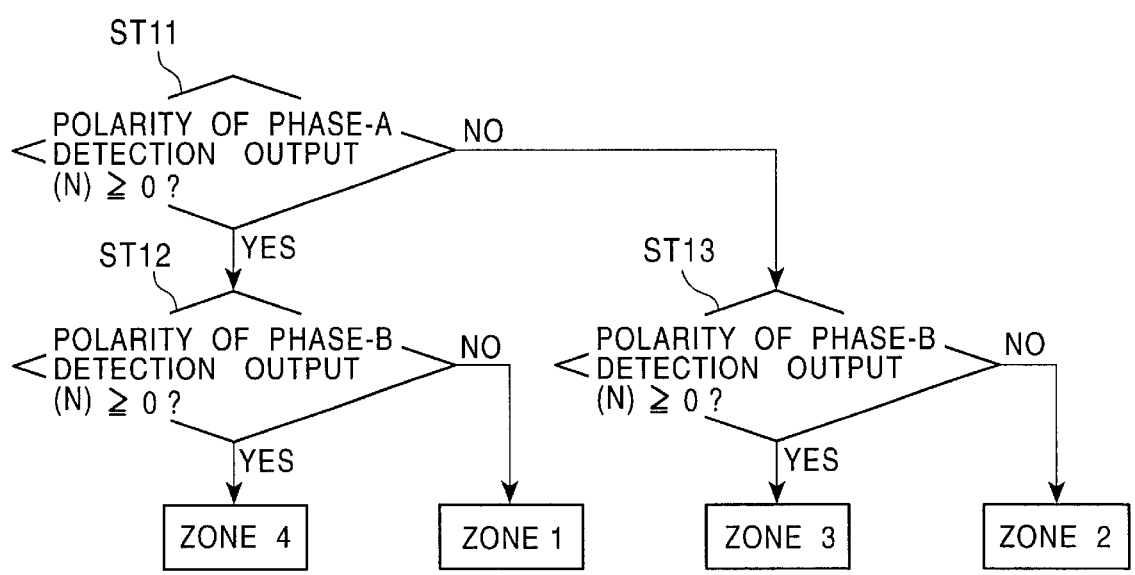
FIG. 11 is a flowchart of an operation for determining a zone in a track from the polarity of the phase-A detection output and that of the phase-B detection output.

FIG. 11 is a flowchart of processing for obtaining the zone where the heads are positioned, which is to be performed before a head positional deviation is calculated.

When it is determined in a ST 11 that the polarity of the phase-A detection output is positive (+) and it is determined in a ST 12 that the polarity of the phase-B detection output is positive (+), it is recognized that the heads are positioned in the zone 4 of any track (hereinafter called the n-th track). When it is determined in the ST 12 that the polarity of the phase-B detection output is negative (−), it is recognized that the heads are positioned in the zone 1. When it is determined in the ST 11 that the polarity of the phase-A detection output is negative (−) and it is determined in a ST 13 that the polarity of the phase-B detection output is positive (+), it is recognized that the heads are positioned in the zone 3. When it is determined in the ST 13 that the polarity of the phase-B detection output is negative (−), it is recognized that the heads are positioned in the zone 2.

Figure 3B:
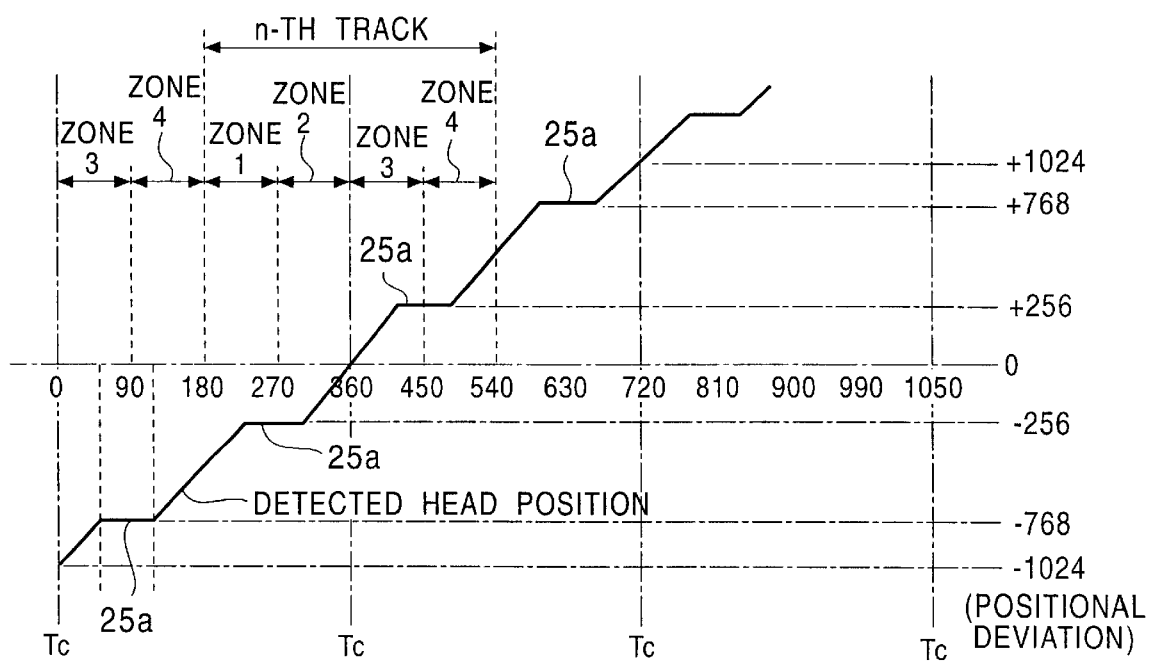
FIG. 3B is a view of the waveform of the calculated positional deviation of a head.

From the zone recognized in the above way and the phase-B detection output, the positional deviation from the head position to the center of the target track is obtained. FIG. 3B shows the positional deviation of the heads in the vertical axis. It is assumed that the target track is the n-th track. Therefore, the positional deviation at the center of the n-th track is zero. In FIG. 3B, a line extending at an angle shows the position where the heads are detected.

A method for calculating the positional deviation from the current position of the magnetic heads to the center of the target track will be described below for each zone.

Calculation in the Zone 1:

Positional deviation=−{(target-track number−current-track number)·TK+0.5 TK}·$Kt$−(phase-B detection output−phase-B center value)·$Ks$, where TK indicates the distance corresponding to one track pitch, and $Kt$ and $Ks$ indicate coefficients.

In FIG. 4A, it is assumed that the heads are currently positioned at a position 20 in the zone 1 and the heads are moving in the inner direction of the disk from this position in a seek operation. As shown in FIG. 3B, when the magnetic heads are currently positioned at a point more outer (in a side having a smaller track number than the target track) than the center of the target track, the distance from the current head position to the center of the target track, namely, the head positional deviation, is measured in negative. When the magnetic heads are currently positioned at a point more inner (in a side having a larger track number than the target track) than the center of the target track, the head positional deviation is measured in positive.

In the first term of the above expression, −(target-track number−current-track number)·TK indicates the distance (positional deviation) from the center (point having a symbol of 21) of the track where the heads are positioned to the center of the target track. When the number of the target track is 10 and the current track number is 2, for example, the distance (positional deviation) from the point 21 at the track center to the center of the target track is −8·TK.

When the heads are positioned at the point 20 in the zone 1, the phase-B detection output is −b. In the zone 1, as the heads approach the target track, the phase-B detection output increases in the negative direction. If this output is used as is, when the heads approach the target track, the distance (positional deviation) is calculated such that it gradually increases in the negative direction. Therefore, the following compensation is applied in the zone 1.

In the first term, 0.5 TK is subtracted. With this operation, the position obtained by subtracting a distance (positional deviation) of 0.5 TK from the point 21 at the track center is detected in FIG. 4A. In other words, the first term means that the head positional deviation indicates a point 22 in FIG. 4A.

In the second term, (phase-B detection output−phase-B center value) shows the phase-B detection output obtained when the center value of the phase-B detection output is set to zero, and (phase-B detection output−phase-B center value)=−b. Therefore, from the positional deviation at the point 22, (phase-B detection output−phase-B center value)=−b is subtracted. Actually, "b" is added. With this operation, the positional deviation from the point 21 at the track center to a position 23 is obtained.

In the zone 4, a compensation of 0.5 TK is applied in the same way. In the zone 2 and the zone 3, as the heads approach the target track from the outer side of the disk, since the positional deviation increases in the positive direction, a compensation of 0.5 TK is not necessary.

Calculation in the Zone 2 and the Zone 3:

Positional deviation=−(target-track number−current-track number)·TK·$Kt$+(phase-B detection output−phase-B center value)·$Ks$.

Calculation in the Zone 4:

Positional deviation=−{(target-track number−current-track number)·TK−0.5 TK}·$Kt$−(phase-B detection output−phase-B center value)·$Ks$.

The coefficients Kt and Ks will be described next.

The coefficient Kt is set such that the movement distance (187.5 μm) in one track corresponds to a resolution of 1024 steps. In other words, the CPU recognizes that the heads are distant from the center of the target track in the disk outer direction by 187.5 μm when the calculated positional deviation becomes −1024 (see FIG. 3B).

Since the centers of tracks appear every 360 degrees in the phase of the phase-B detection output, 360 degrees in the phase-B detection output correspond to 1024 steps. Since the peaks of the phase-B detection output appear every 180 degrees, the coefficient Ks may be determined such that the peak-to-peak value corresponds to a resolution of 2/1024= 512.

In the present embodiment, however, it is considered that the phase difference (90 degrees) between the phase-A and phase-B detection outputs may have an error of ±30 degrees, and therefore, the coefficient Ks is determined such that the peak-to-peak multiplied by cos(60 degrees) corresponds to a resolution of 512.

As a result, when it is assumed that the phase-A detection output has a phase error of ±30 degrees, the phase-B detection output is fixed to a +256 step or a −256 step correspondingly to the range of ±30 degrees. In other words, within the range where the phase-A detection output may have a phase error, restriction is applied to the phase-B detection output such that the output has a fixed value of the +256 step or the −256 step. A dead zone 25 indicates the phase-B detection output corresponding to the phase-error range of ±30 degrees.

Figure 4B:
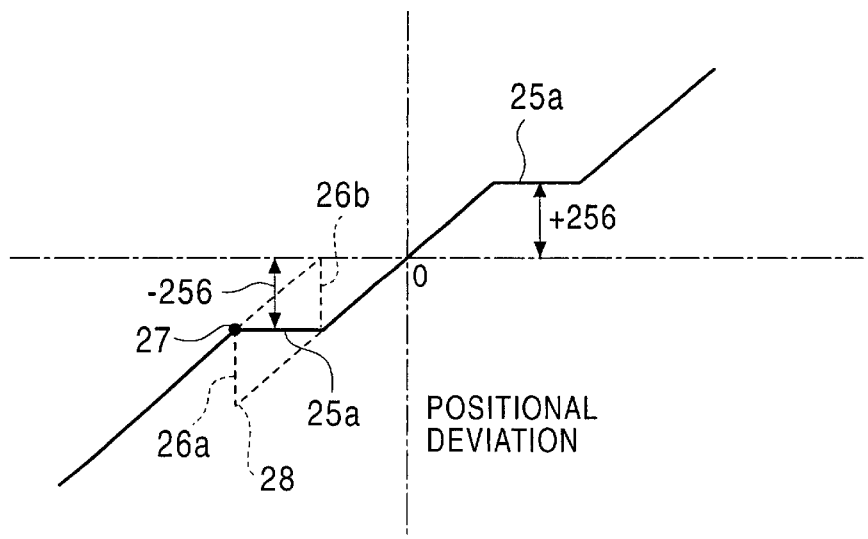

Therefore, as shown in FIG. 3B and FIG. 4B, the calculation result of the positional deviation in each of the zone 1 to the zone 4 includes zones 25a where the calculated values are constant irrespective of the position of the heads.

It is assumed that the zones 25a are not provided, and the phase difference between the phase-A and phase-B detection outputs has a phase error of +30 degrees or −30 degrees against the designed value of 90 degrees, as shown in FIG. 4A. As described above, in the calculation of the positional deviation according to the present invention, the zone where the heads are positioned is determined according to the combination of the polarity of the phase-A detection output and that of the phase-B detection output to be the zone 1, the zone 2, the zone 3, or the zone 4. The calculation expressions differ between the zone 1 and the zone 2 or the zone 3, and between the zone 2 or the zone 3 and the zone 4.

As indicated by dotted lines in FIG. 4A, when the phase of the phase-A detection output is shifted ±30 degrees in the worst case, the boundary between the zone 1 and the zone 2 and the boundary between the zone 3 and the zone 4, which are determined by the combinations of the polarity of the phase-A detection output and that of the phase-B detection output, are shifted by ±30 degrees. As a result, the positional deviation obtained by the above expressions has steps shown by dotted lines 26a and 26b. When the phase of the phase-A detection output is shifted at random within the range of ±30 degrees, the calculated value of the positional deviation is positioned in the area enclosed by the dotted lines 26a and 26b, and differs according to the used unit.

While the heads are in a close vicinity of the center of the target track and the movement speed is low, for example, if the head position enters the steps indicated by the dotted lines 26a and 26b, the positional deviation may abruptly changes from the value corresponding to a symbol 27 to the value corresponding to a symbol 28. In this case, the CPU 7 determines that the heads have suddenly returned to the outer side of the disk and controls such that the heads are greatly accelerated, and a seek error may occur at the center of the target track. Alternatively, the CPU 7 determines that the heads are abruptly returned, and as a result, the movement direction of the heads may be undetermined.

When the phase-B detection output has the dead zones 25, corresponding to the phase error of ±30 degrees, as shown in FIG. 3A and FIG. 4A, even if the phase-A detection output has a phase error of +30 degrees and thereby the boundary between the zone 1 and the zone 2 and the boundary between the zone 3 and the zone 4 are changed, since calculated values are limited to ±256, the CPU 7 determines that the heads have not been moved in the zones 25a where a constant value is obtained and controls such that the heads are moved in the original movement direction while the constant value is obtained. Therefore, even if the phase-A detection output has a phase error, the heads are positively moved to the target track.

(Speed Control in a Seek Operation)

In a seek operation, until the heads come close to the target track, the CPU 7 performs calculation for head speed control and controls the linear-motor driving section 5 according to the calculation result.

Figure 5:
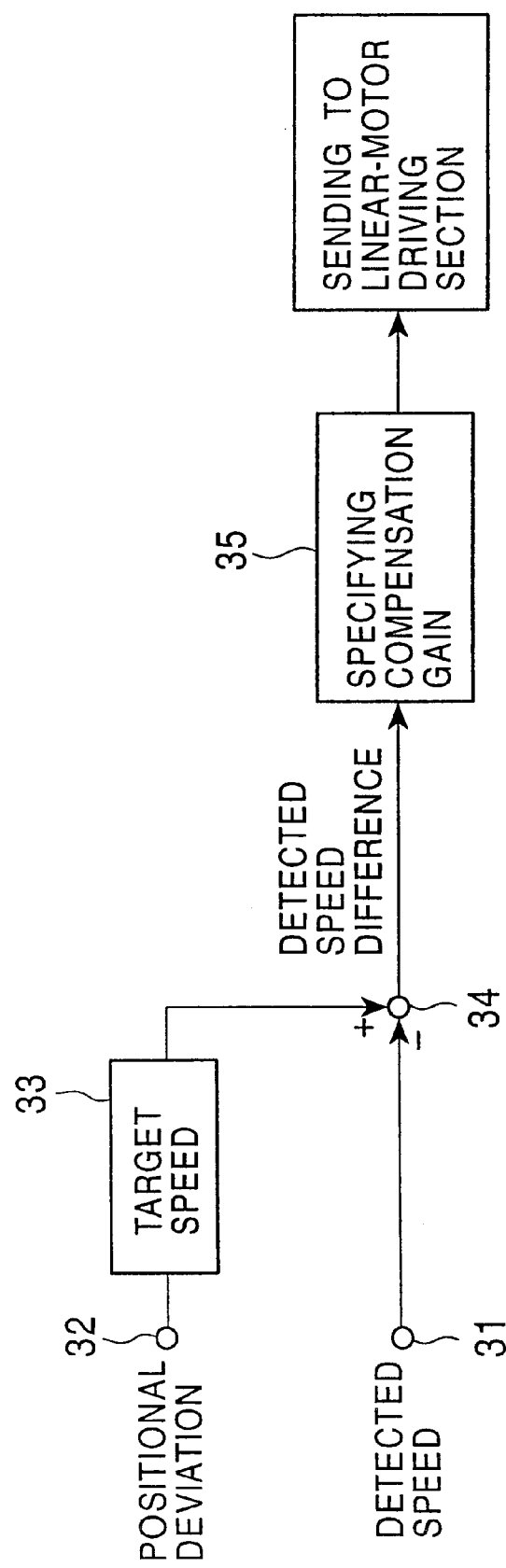
FIG. 5 is an operational block diagram of a speed control program in a seek operation.

FIG. 5 is an operational block diagram of a speed control program to be executed by the CPU 7.

When the magnetic heads are moving to the center of the target track, the current head speed is detected by the use of the frequency of the detection output of either phase obtained by the linear sensor 8. This speed is indicated in FIG. 5 as a detected speed 31. On the other hand, from the above calculation, a positional deviation 32 from the current head position shown in FIG. 3B to the center of the target track is obtained.

The CPU 7 stores a table of a target speed 33 corresponding to the positional deviation 32, and obtains the target speed 33 corresponding to the obtained positional deviation 32. A difference between the target speed 33 and the current detected speed 31 is indicated as a detected speed difference 34. The CPU 7 multiplies the detected speed difference 34 by a seek compensation gain 35 specified according to the positional deviation, and sends the result to the linear-motor driving section 5. The linear-motor driving section 5 is accelerated or decelerated according to the sent signal.

Figure 7:
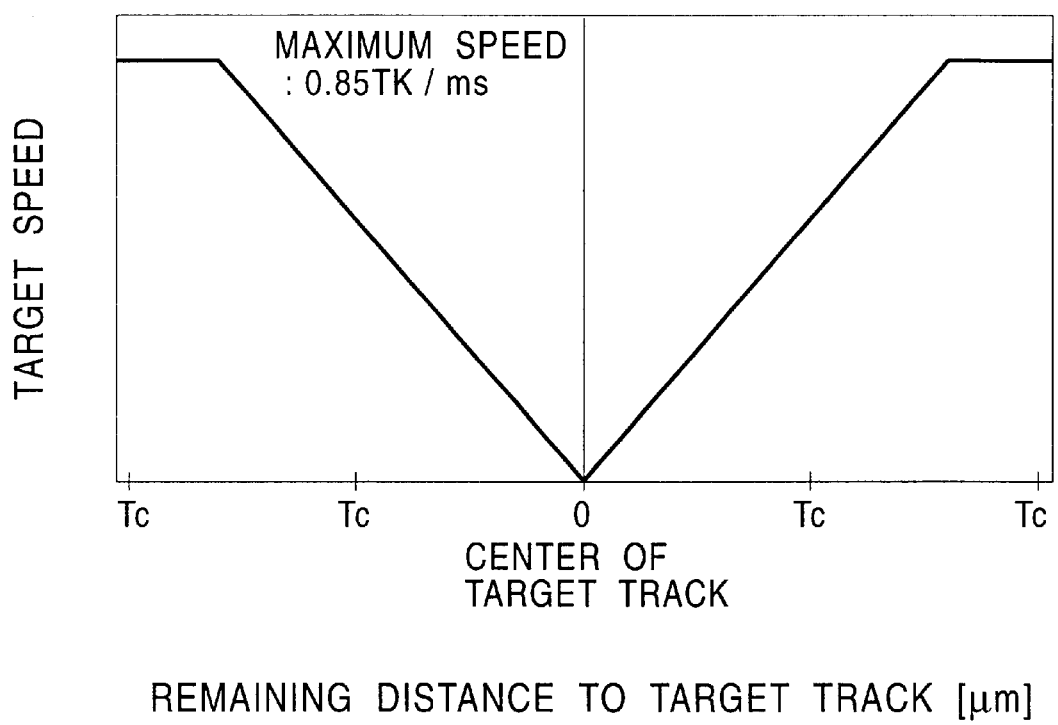
FIG. 7 is a view showing an example profile of a target speed in a seek operation.

FIG. 7 shows the relationship between the distance to the center of the target track and the target speed 33. The target speed 33 is set such that it is the constant maximum speed (for example, 0.85 TK/ms) until the heads pass the center of the track two tracks before the target track and the target speed is reduced in a linear manner until the heads reach the center of the target track. In the speed control shown in FIG. 5, servo is applied such that the head movement speed matches the target speed 33.

Figure 8:
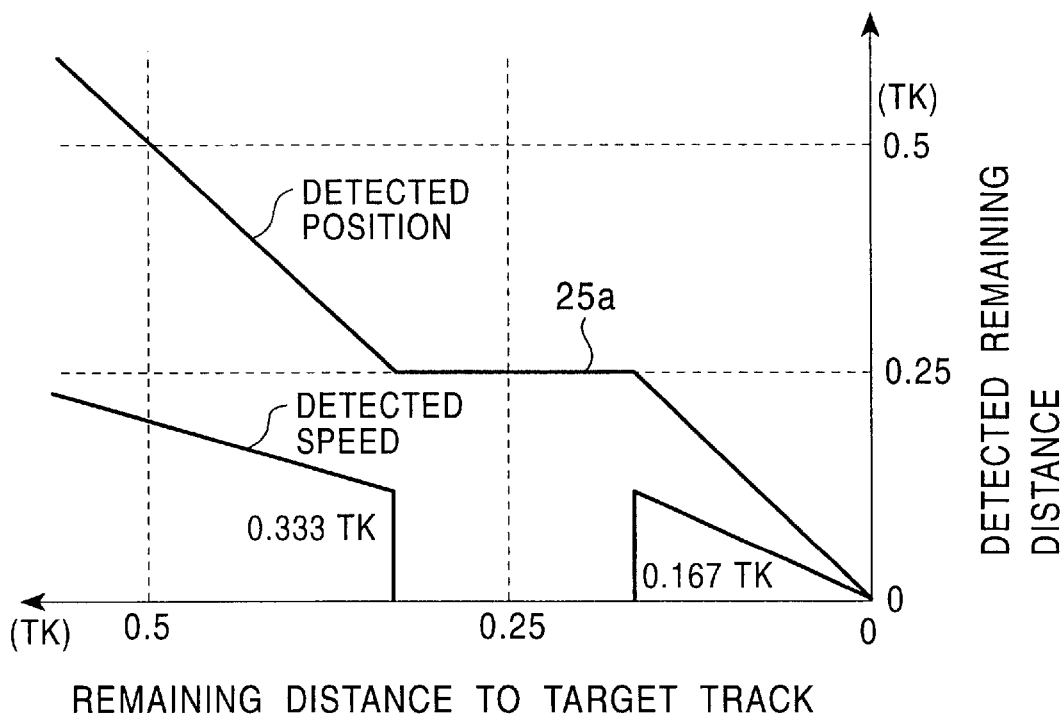
FIG. 8 is a view showing the relationship between a head position and a head speed detected when the heads approach the center of the target track.

FIG. 8 shows detected head positions and detected speeds while the magnetic heads are in the close vicinity of the center of the target track.

As shown in FIG. 3A, immediately before the heads reach the center of the target track, namely, while the heads are positioned in an area of 90 degrees to 120 degrees before the center of the target track, since the phase-B detection output has a dead zone 25, the head position (positional deviation)

calculated from the phase-A and phase-B detection outputs is detected as if the heads were stopped in the area. Since the phase-B detection output is not changed in this area, the detected speed is zero. In this case, control for moving the heads in the target-track direction continues. In the speed control block shown in FIG. 5, the detected speed difference 34 becomes large when the heads are in the dead zone 25, and as a result, the heads are accelerated such that it is moved in the direction of the center of the target track.

Figure 12:
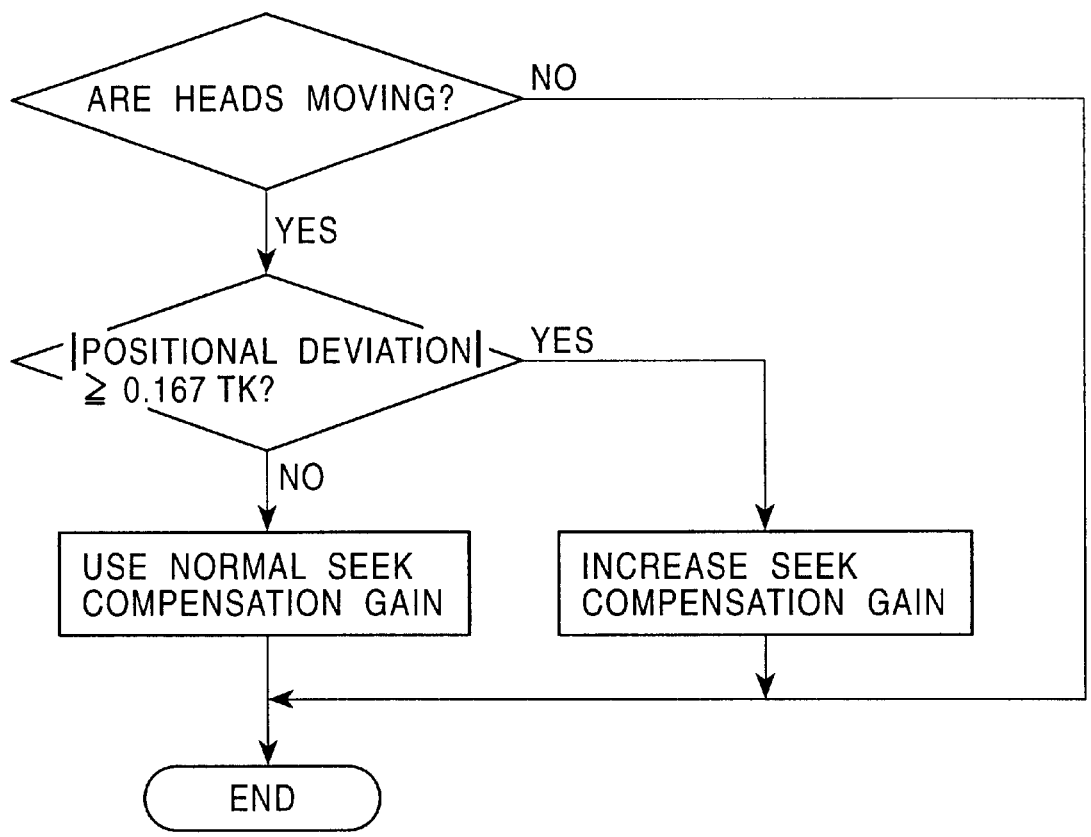
FIG. 12 is a flowchart of a speed-control operation to be executed when the heads approach the center of the target track.

Therefore, as shown in a flowchart illustrated in FIG. 12, immediately after the heads reach the point 0.167 TK from the center of the target track, namely, immediately after the heads pass through the dead zone 25, the seek compensation gain specified in FIG. 5 is made higher than that used in the other cases. When the heads pass through the dead zone 25 and approach the center of the target track, since the heads are accelerated, the detected speed difference 34, which is a difference between the target speed 33 and the detected speed 31 shown in FIG. 5, becomes very large. Because the specified seek compensation gain has been set larger than the normal case, the heads are greatly decelerated and as a result, an error is prevented such as an error in which the heads erroneously pass the center of the target track.

(On-track Control)

When the magnetic heads are in a close vicinity of the center of the target track and when the magnetic heads are positioned at the center of the target track, the control in the CPU 7 is switched to on-track control and servo caused by this on-track control is applied to the linear-motor driving section 5.

Figure 6:
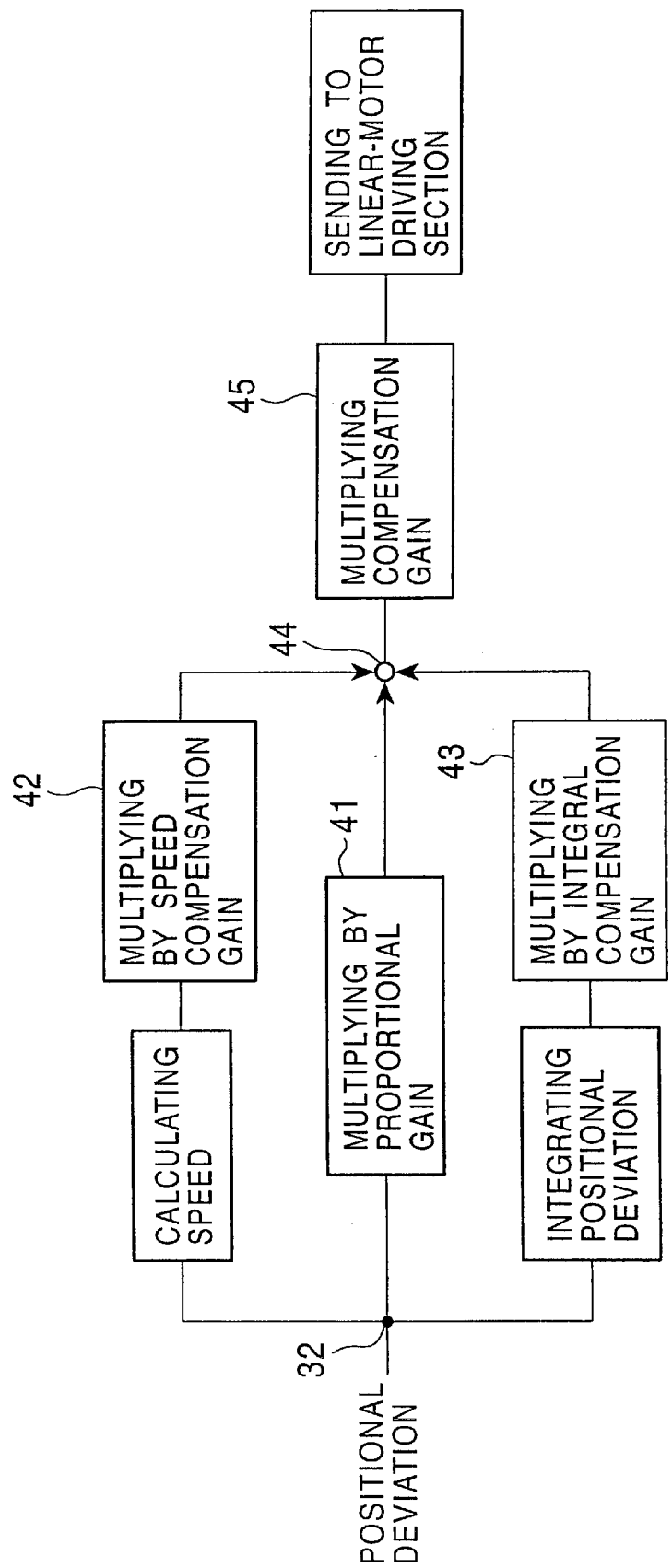
FIG. 6 is an operational block diagram of an on-track control program.

FIG. 6 is an operational block diagram of the on-track control to be executed by the CPU 7.

In the on-track control, from the positional deviation 32 obtained from the phase-A and phase-B detection outputs, speed information is calculated by a differentiation and the deviation from the target is integrated. The obtained differential, proportional, and integral information are multiplied by a speed compensation gain 42, a proportional gain 41, and an integral compensation gain 43, respectively, are added 44 to each other, the addition result is multiplied by a compensation gain 45, and then is sent to the linear-motor driving section 5. The proportional gain 41 is used to generate a compensation output in a direction in which the positional deviation from the target is eliminated. The speed compensation gain 42 is used to perform compensation in a direction in which an abrupt positional change which is caused as a result of compensation performed by the proportional gain is suppressed. The integral compensation gain 43 is used to perform compensation in a direction in which an offset always generated by a force such as friction is absorbed.

In this on-rack control, servo is applied to the linear-motor driving section 5 so as to place the heads at an on-track position steadily.

Figure 9:
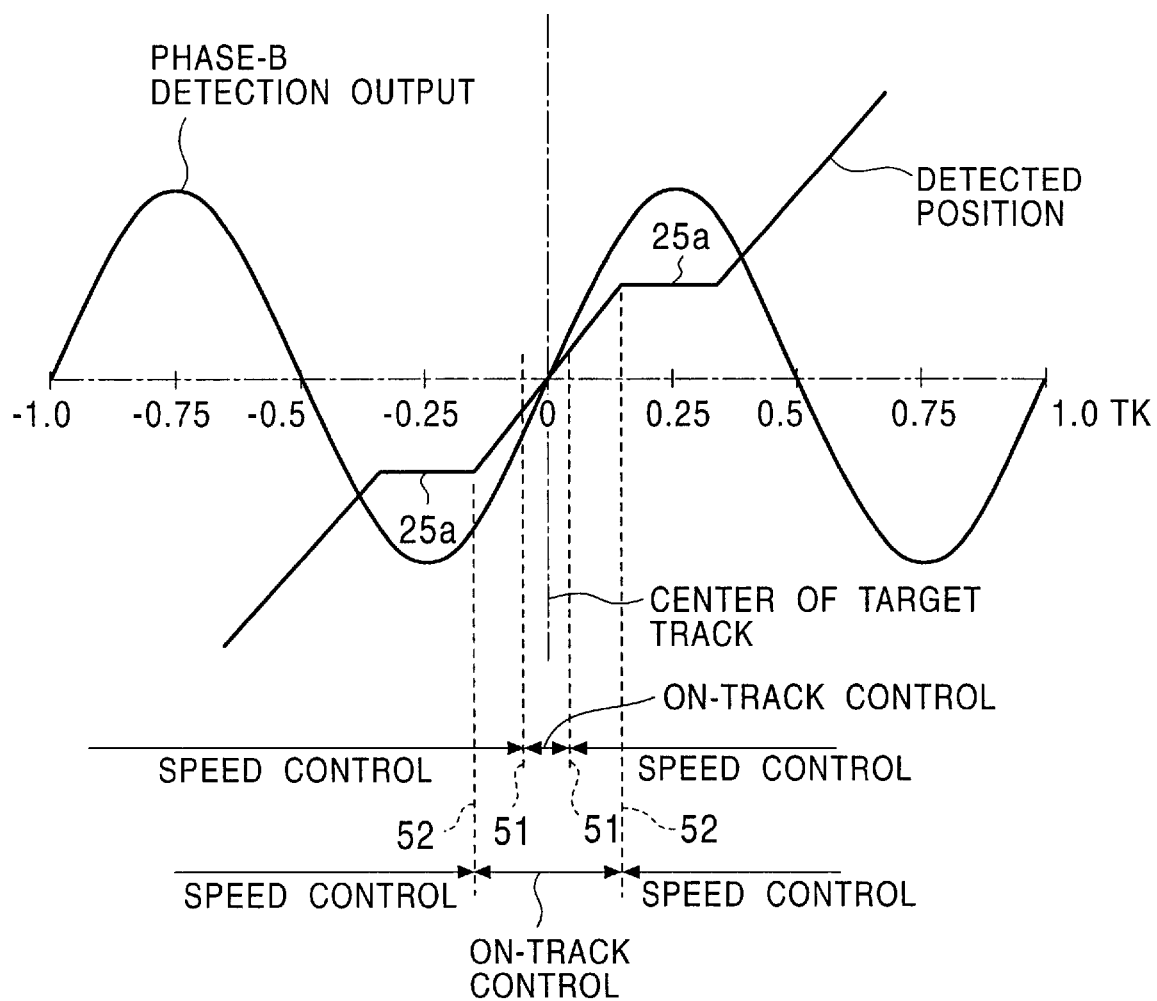
FIG. 9 is a view showing switching points between speed control and on-track control.

FIG. 9 shows the timing of switching from the speed control to the on-track control and switching from the on-track control to the speed control.

The speed control is switched to the on-track control when the heads pass through the area of the constant value 25a corresponding to a dead zone 25 and come to a point 0.05 TK from the center of the target track while the heads are approaching the center of the target track in a seek operation. This switching point (first switching point) is indicated by a symbol 51 in the figure. The on-track control is switched to the speed control if the heads pass a second switching point 52 when the heads are released from a condition in which the heads are positioned at the center of the target track in the on-track control, namely, when the heads are moved away from the center of the target track.

The second switching point 52 is set farther from the center of the target track than the first switching point 51. It is preferred as shown in FIG. 9 that the second switching point 52 be set at an end near the target track of a dead zone 25, namely, at a point TK/4 away from the center of the target track.

The speed control operates the heads so as to quickly approach the center of the target track and the on-track control functions such that the heads are stable at the center of the track.

When the switching point 51 is set in a close vicinity of the center of the target track, the heads are rapidly moved to the center of the target track and then the control is switched to the on-track control. In the on-track control, when the switching point 52, where the control is switched to the speed control, is placed away from the center of the target track, more stable on-track control is performed in an extended area.

Figure 13:
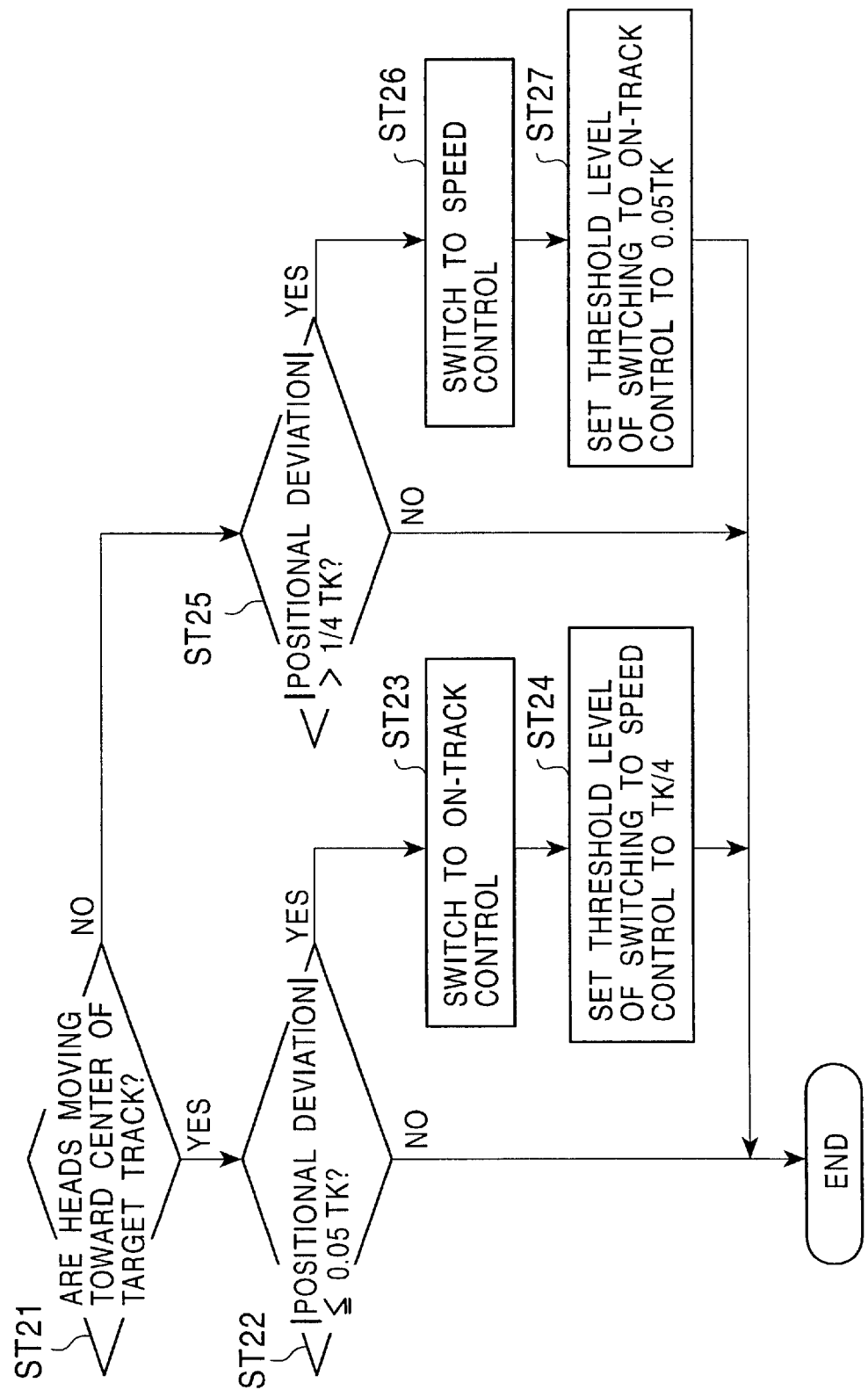
FIG. 13 is a flowchart of an operation for setting switching points between the speed control and the on-track control.
Figure 14A:
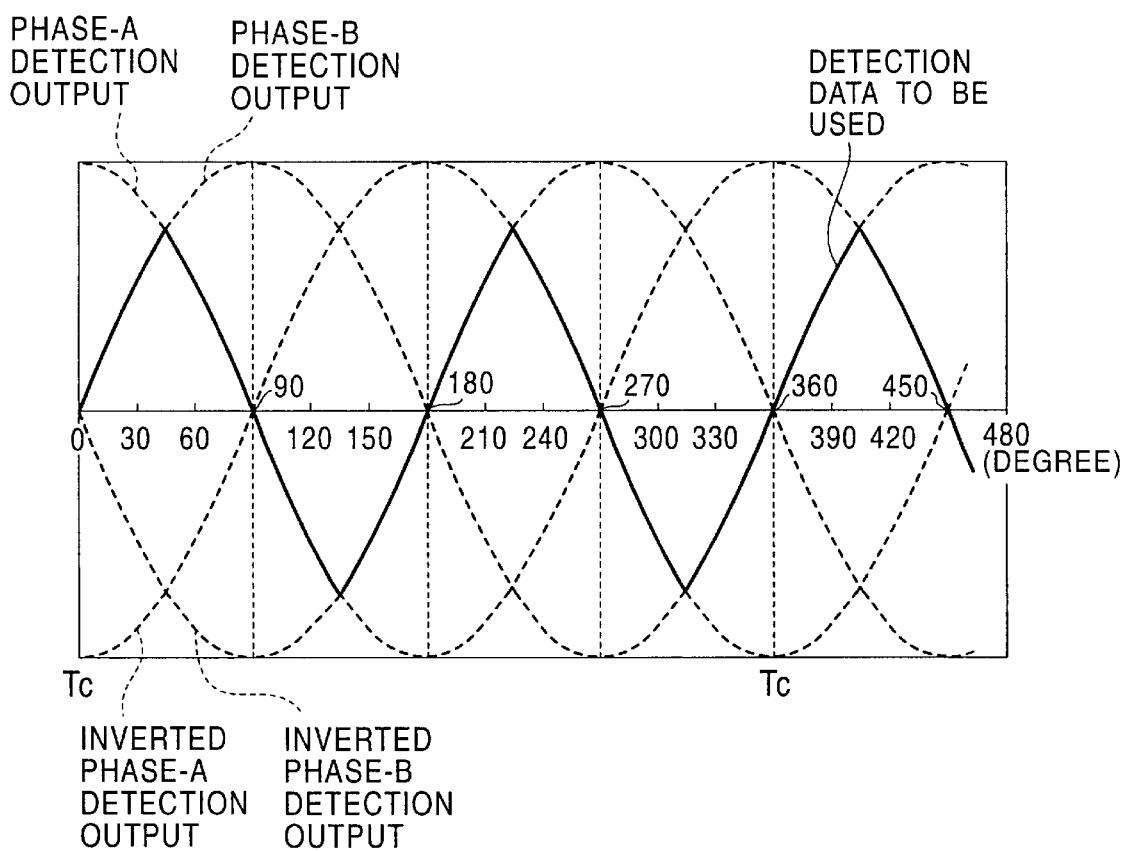
FIGS. 14A and 14B show a conventional detection method of the positional deviation of a head.
Figure 14B:
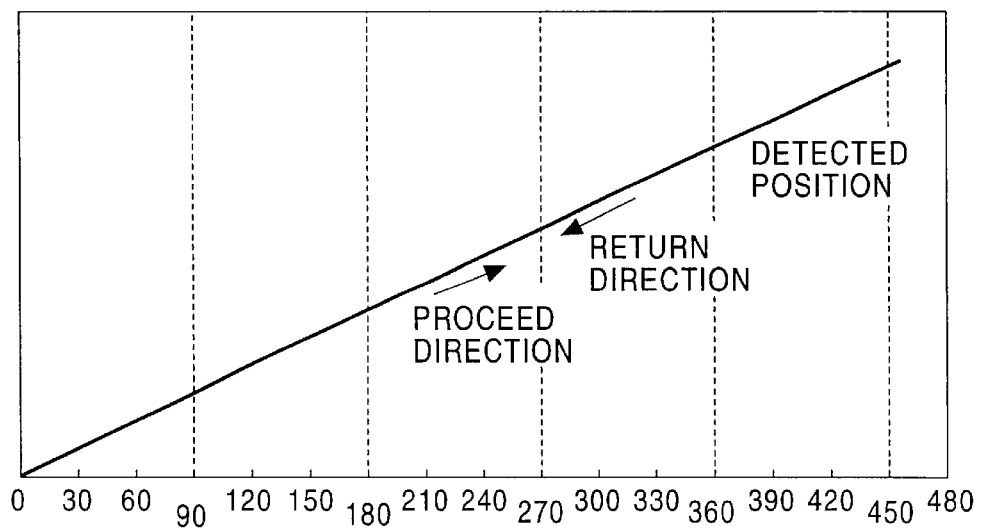
Figure 15A:
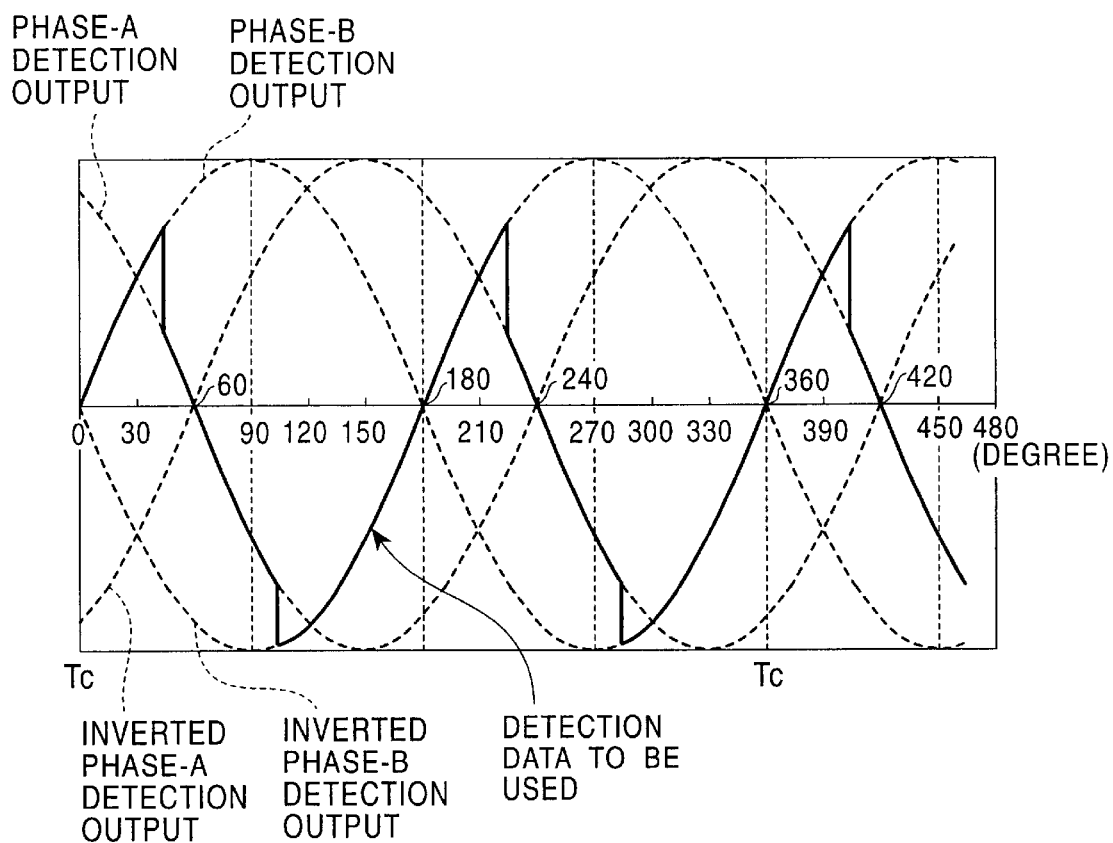
FIGS. 15A and 15B show a conventional detection method of the positional deviation of a head, in which the phase-A detection output and the phase-B detection output have a relative phase error.
Figure 15B:
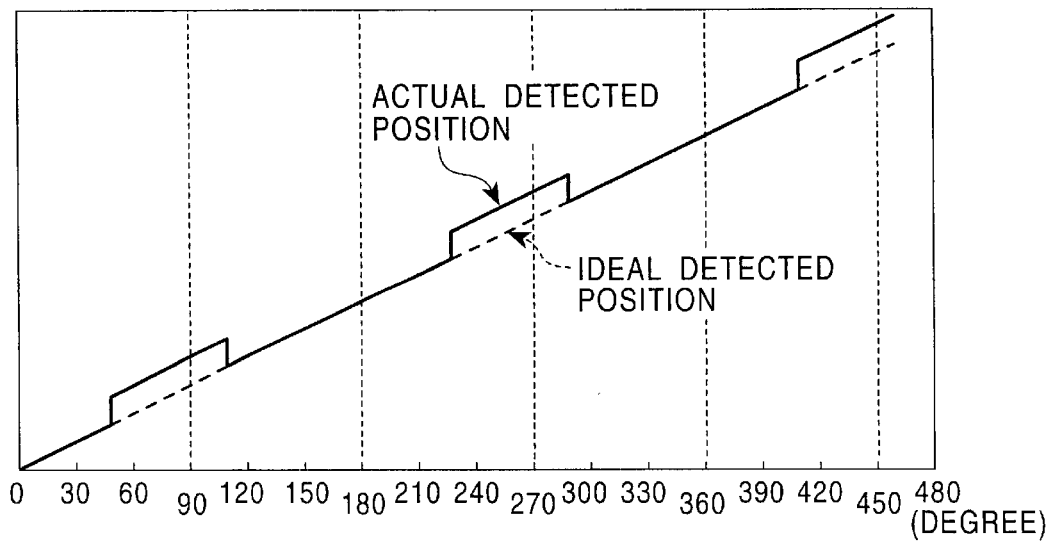

FIG. 13 is a flowchart of control for setting the switching points.

In a ST 21, when it is determined that the heads are moving toward the center of the target track, whether the positional deviation of the heads is smaller than 0.05 TK (the heads pass the switching point 51) is monitored in a ST 22. When the positional deviation becomes smaller than it, the speed control is switched to the on-track control in a ST 23. Then, in a ST 24, the switching point 52, where the on-track control is switched to the speed control, is set at the point having a positional deviation of TK/4.

When it is determined in the ST 21 that the magnetic heads are stopped at the on-track position, it is monitored in a ST 25 whether the positional deviation of the heads exceeds TK/4. When it exceeds, the on-track control is switched to the speed control in a ST 26 and servo is executed such that the heads are quickly returned to the center of the target track. In a ST 27, the switching point 51, where the speed control is switched to the on-track control, is set at the point having a positional deviation of 0.05 TK.

The detection section, which obtains the phase-A and phase-B detection outputs, may use a magnetic detection method, instead of an optical method. The phase-B detection output may have the shape of a triangular wave corresponding to the movement of the heads. Since only the polarity of the phase-A detection output is used, it may be a rectangular wave.

What is claimed is:

1. A head control unit in a disk apparatus having a rotation driving section for driving a disk, a head facing a recording surface of the disk, head feeding means for feeding the head in a direction in which the head traverses tracks on the disk, a detection section for generating a detection output changed according to the movement of the head, and a control section for controlling the head feeding means according to the detection output obtained by the detection section, wherein the detection section outputs phase-A and phase-B detection outputs having different phases and having polarities changing at an interval of half the period according to the movement of the head are transmitted to the control section; and the control section controls such that it is determined from a combination of the polarity of the phase-A detection output and that of the phase-B detection output whether the head has been moved to an adjacent track, the track number of the current head position is incremented or decremented by 1, an intra-track deviation from the current head position to the center of the track is detected by the control section by the use of either the phase-A detection output or the phase-B detection output, a deviation from the current head position to the center of the target track is calculated from the track number and the detected intra-track deviation, said phase-A and phase-B detection outputs have a relative phase-shift tolerance, and whichever of the phase-A or phase-B detection outputs used for detecting outputs used for detecting the intra-track deviation is provided with a dead zone where the relative phase-shift tolerance may be generated and detected values are fixed and a signal is sent to the head feeding means instructing it to move the head according to the deviation from the current head position to the center of the target track.

2. A head control unit according to claim 1, wherein the phase-A detection output and the phase-B detection output have a phase difference of approximately one-fourth the period, one track is divided into four zones each having a different combination of the polarity of the phase-A detection output and the polarity of the phase-B detection output, a track-number difference between the number of the target track and that of the track where the head is positioned and an intra-track deviation from the current head position to the center of the track are detected in each of the four zones, and a deviation to the center of the target track is calculated from the track-number difference and the intra-track deviation.

3. A head control unit according to claim 2, wherein the control section performs speed control for sending a speed control signal to the head feeding means when the head approaches the target track;

a detected speed difference is obtained from a difference between the current detected movement speed of the head and a target speed specified according to the deviation from the current head position to the center of the target track, and a compensation gain is set in the speed control signal according to the detected speed difference; and the compensation gain is increased when the head passes through the dead zone provided for the target track and approaches the center of the target track.

4. A head control unit according to claim 3, wherein, in the control section, when the head is positioned at the center of the target track, on-track control for sending an on-track control signal to the head feeding means is performed, and a proportional gain for compensating for the deviation from the current head position to the center of the target track is set in the on-track control signal in the on-track control; and when the head approaches the center of the target track, the speed control is switched to the on-track control at a first switching point where the head is positioned a predetermined distance away from the dead zone in the target track, the on-track control is switched to the speed control at a second switching point where the head is moved away from the center of the target track after the control has been switched to the on-track control, and the second switching point is disposed at a position farther away from the center of the target track than the first switching point.

5. A head control unit according to claim 4, wherein the second switching point matches an end of the dead zone, closer to the center of the target track.

* * * * *